United States Patent
Craske et al.

(10) Patent No.: US 10,354,092 B2
(45) Date of Patent: Jul. 16, 2019

(54) HANDLING ACCESS ATTRIBUTES FOR DATA ACCESSES

(71) Applicant: ARM LIMITED, Cambridge (GB)

(72) Inventors: Simon John Craske, Cambridge (GB); Antony John Penton, Little Canfield (GB)

(73) Assignee: ARM Limited, Cambridge (GB)

( * ) Notice: Subject to any disclaimer, the term of this patent is extended or adjusted under 35 U.S.C. 154(b) by 60 days.

(21) Appl. No.: 14/912,300

(22) PCT Filed: Jul. 15, 2014

(86) PCT No.: PCT/GB2014/052154
§ 371 (c)(1),
(2) Date: Feb. 16, 2016

(87) PCT Pub. No.: WO2015/025129
PCT Pub. Date: Feb. 26, 2015

(65) Prior Publication Data
US 2016/0210465 A1   Jul. 21, 2016

(30) Foreign Application Priority Data
Aug. 23, 2013 (GB) .................. 1315108.9

(51) Int. Cl.
*G06F 21/62* (2013.01)
*G06F 21/60* (2013.01)
(Continued)

(52) U.S. Cl.
CPC ........ *G06F 21/629* (2013.01); *G06F 9/30043* (2013.01); *G06F 9/45558* (2013.01);
(Continued)

(58) Field of Classification Search
CPC .... G06F 21/629; G06F 9/45558; G06F 9/468; G06F 9/4812; G06F 2009/45579;
(Continued)

(56) References Cited

U.S. PATENT DOCUMENTS

| | | | | |
|---|---|---|---|---|
| 6,574,736 B1 * | 6/2003 | Andrews | ................ | G06F 9/468 707/999.1 |
| 8,347,380 B1 * | 1/2013 | Satish | .................... | G06F 11/00 708/200 |

(Continued)

FOREIGN PATENT DOCUMENTS

| | | |
|---|---|---|
| EP | 0 735 462 | 10/1996 |
| GB | 2 392 998 | 3/2004 |

(Continued)

OTHER PUBLICATIONS

Burdonov, Igor, Alexander Kosachev, and Pavel Iakovenko. "Virtualization-based separation of privilege: working with sensitive data in untrusted environment." Proceedings of the 1st EuroSys Workshop on Virtualization Technology for Dependable Systems. (pp. 1-6). ACM, 2009. (Year: 2009).*

(Continued)

*Primary Examiner* — Kari L Schmidt
(74) *Attorney, Agent, or Firm* — Nixon & Vanderhye P.C.

(57) ABSTRACT

A data processing apparatus (2) has processing circuitry (4) for executing first software (12) at a first privilege level EL1 and second software (10) at a second privilege level EL2 higher than the first privilege level. Attributes may be set by the first and second software (10, 12) to indicate whether execution of the data access instruction can be interrupted. For a predetermined type of data access instruction for which the second attribute set by the second software (10) specifies that the instruction can be interrupted, the instruction may be set as interruptable even if the first attribute set (Continued)

|  | | OS-controlled attributes | |
|---|---|---|---|
|  | | MPU 1-Normal | MPU 1-Device |
| Hypervisor controlled attributes | MPU 2-Normal | Normal | if control = 1, Normal (retain ordering) if control = 0, Device |
|  | MPU 2-Device | Device | Device | by the first software (12) specifies that the execution of the instruction cannot be interrupted.

14 Claims, 4 Drawing Sheets

(51) Int. Cl.
    *G06F 21/50*      (2013.01)
    *G06F 9/30*      (2018.01)
    *G06F 9/48*      (2006.01)
    *G06F 9/455*      (2018.01)
    *G06F 13/24*      (2006.01)
    *G06F 21/00*      (2013.01)
    *G06F 9/46*      (2006.01)

(52) U.S. Cl.
    CPC ............ *G06F 9/4812* (2013.01); *G06F 13/24* (2013.01); *G06F 21/50* (2013.01); *G06F 21/60* (2013.01); *G06F 9/468* (2013.01); *G06F 21/00* (2013.01); *G06F 2009/45579* (2013.01)

(58) Field of Classification Search
    CPC . G06F 21/10; G06F 21/50; G06F 2/60; G06F 9/45533
    See application file for complete search history.

(56) References Cited

U.S. PATENT DOCUMENTS

| | | | | |
|---|---|---|---|---|
| 8,443,188 | B2* | 5/2013 | Borde | G06F 21/53 713/165 |
| 8,726,292 | B2* | 5/2014 | So | G06F 9/4812 710/260 |
| 8,898,459 | B2* | 11/2014 | Chawla | H04L 9/321 713/156 |
| 9,081,602 | B1* | 7/2015 | Omelyanchuk | G06F 11/3644 |
| 2001/0047470 | A1* | 11/2001 | Roche | G06F 13/26 712/244 |
| 2004/0054831 | A1* | 3/2004 | Johansson | G06F 21/86 710/200 |
| 2004/0111593 | A1 | 6/2004 | Arimilli et al. | |
| 2005/0138354 | A1* | 6/2005 | Saltz | G06F 9/468 713/153 |
| 2006/0031838 | A1* | 2/2006 | Chrabieh | G06F 9/4881 718/100 |
| 2006/0294519 | A1* | 12/2006 | Hattori | G06F 9/45558 718/1 |
| 2008/0046621 | A1 | 2/2008 | Okino et al. | |
| 2008/0155679 | A1* | 6/2008 | Sebot | G06F 21/556 726/16 |
| 2009/0222816 | A1* | 9/2009 | Mansell | G06F 12/145 718/1 |
| 2009/0249448 | A1* | 10/2009 | Choi | H04L 63/0815 726/4 |
| 2011/0093750 | A1* | 4/2011 | Williams | G06F 9/5077 714/47.2 |
| 2011/0179438 | A1* | 7/2011 | Bulkowski | H04N 21/8173 725/25 |
| 2014/0372979 | A1* | 12/2014 | Ross | G06F 8/60 717/120 |
| 2017/0123800 | A1* | 5/2017 | Frazier | G06F 9/45533 |

FOREIGN PATENT DOCUMENTS

| | | |
|---|---|---|
| JP | 2004-139503 | 5/2004 |
| TW | 1240205 | 9/2005 |
| TW | 200643790 | 12/2006 |

OTHER PUBLICATIONS

G. Kornaros, M. D. Grammatikakis and M. Coppola, "Towards Full Virtualization of Heterogeneous NoC-based Multicore Embedded Architectures," 2012 IEEE 15th International Conference on Computational Science and Engineering, Nicosia, 2012, pp. 345-352. (Year: 2012).*
International Search Report for PCT/GB2014/052154, dated Oct. 23, 2014, 2 pages.
Search Report for GB 1315108.9, dated Jan. 20, 2014, 3 pages.
International Preliminary Report on Patentability dated Mar. 3, 2016 in PCT/GB2014/052154, 7 pages.
Taiwanese Search Report dated Mar. 16, 2018 in TW Application No. 103126934, 1 page.

* cited by examiner

|  | OS-controlled attributes | |
| --- | --- | --- |
|  | MPU 1-Normal | MPU 1-Device |
| Hypervisor controlled attributes — MPU 2-Normal | Normal | if control = 1, Normal (retain ordering) if control = 0, Device |
| MPU 2-Device | Device | Device |

HANDLING ACCESS ATTRIBUTES FOR DATA ACCESSES

This application is the U.S. national phase of International Application No. PCT/GB2014/052154 filed 15 Jul. 2014, which designated the U.S. and claims priority to GB Patent Application No. 1315108.9 filed 23 Aug. 2013, the entire contents of each of which are hereby incorporated by reference.

The present technique relates to the field of data processing. More particularly, the technique relates to handling access attributes for data accesses in a data processing apparatus.

Data access instructions for accessing data from a data store may be provided with access attributes which control how the data access is performed. For example, the access attributes may specify whether a data access can be handled out of turn with respect to other data accesses and when or how the data accessed should be cached. However, some access attributes may affect the latency associated with performing a data access. In a real time system (for example, an apparatus used in automotive or industrial applications), it is often desirable to have deterministic behaviour with respect to how long particular processing operations will take complete, and so the long latency associated with certain data accesses can be problematic. This is particularly the case when many different software applications are combined in a single processor, in which case one application may start a long latency data access, which may prevent another software application carrying out a real time critical operation. The present technique seeks to address these issues.

Viewed from one aspect, the present technique provides a data processing apparatus comprising:

processing circuitry configured to process data;

a data store configured to store data;

wherein said processing circuitry is configured to execute first software at a first privilege level and to execute second software at a second privilege level higher than the first privilege level;

in response to a data access instruction for accessing data in the data store, the data processing apparatus is configured to determine at least one access attribute for said data access instruction based on at least one first attribute set by the first software and at least one second attribute set by the second software, said at least one first attribute and said at least one second attribute each specifying whether execution of the data access instruction can be interrupted; and in response to a predetermined type of data access instruction for which said at least one second attribute specifies that execution of the data access instruction can be interrupted, the data processing apparatus is configured to determine said at least one access attribute specifying that execution of the data access instruction can be interrupted even if said at least one first attribute specifies that execution of the data access instruction cannot be interrupted.

One type of data access attribute may specify whether execution of the data access instruction can be interrupted. Some types of data access instruction may take a long time to carry out, and so whether the data access instruction can be interrupted part-way through the data access can be important in a real time system. If a real-time-critical event, such as an interrupt which needs to be serviced immediately, occurs during a data access marked as non-interruptable, then the processing circuitry may be committed to completing the data access, causing a delay in handling the real-time-critical event which is undesirable.

The processing apparatus may support several pieces of software including first software executing at a first privilege level and second software executing at a second privilege level higher than the first privilege level. Each layer of software may set their own access attributes for a data access instruction, with at least one first attribute specified by the first software and at least one second attribute specified by the second software each specifying whether execution of the data access instruction can be interrupted. In typical schemes, where different access attributes are set for the same data access, the most restrictive attribute would be selected as the actual attribute for the data access. For example, if the first software specifies that the access cannot be interrupted then this would normally override any less restrictive attributes allowing interruption of the data access. However, if the data access takes a long time to carry out then the more restrictive access attribute could affect the ability to service real-time-critical events.

Therefore, for a predetermined type of data access instruction for which at least one second attribute set by the second software specifies that execution of the data access instruction can be interrupted, the processing circuitry may determine the access attribute as specifying that execution can be interrupted, even if the at least one first attribute set by the first software specifies that execution cannot be interrupted. Hence, the attribute set by the first software may be overruled by the attribute set by the second software at the higher privilege level, to ensure that the data access instruction can be interrupted in the event of a real-time-critical event. This prevents long interrupt handling latencies, for example. This approach is counter-intuitive because one would normally handle the access using the most restrictive of the conflicting attributes set for the data access.

While this technique could be used for any data access instruction, it is particularly useful for instructions to be executed over a plurality of processing cycles, which could cause a long delay if they are marked as non-interruptable.

If execution of the data access instruction can be interrupted, then on occurrence of an interrupt, exception or another real-time-critical event, execution of the instruction may be suspended. Once the event has been handled, execution of the data access instruction may either be restarted from the beginning or, if possible, may be resumed from the point at which the data access is interrupted.

The present technique may be applied in general to the predetermined type of data access instruction occurring within any software executed by the processing circuitry. Alternatively, the determination of the access attribute as described above may be used only when the predetermined type of data access instruction appears in one or more specific types of software, in particular the first software itself or further software running under control of the first software. If the predetermined type of data access instruction is encountered within the second software, then its access attributes can be determined based on the second attributes specified by the second software, without considering the first attribute specified by the first software. Hence, the attribute determination described above need not be used for all occurrences of the predetermined type of data access instruction.

The first and second software may be any software operating a different privilege levels, with the second software having a higher privilege than the first software. In this context "higher privilege level" means that the software operating at this privilege level has more rights than software operating a "lower privilege level" (e.g. the second software may be able to access data that is inaccessible to the first software, or the second software may be able to perform certain actions which are not available to the first software). The first and second privilege levels may be any two privilege levels within a greater number of levels. The different privilege levels may be represented by numeric values. In some embodiments the highest numeric value may represent the higher privilege level (e.g. privilege level 3 may be have greater rights than privilege level 2), while in other embodiments the lowest numeric value may represent the highest privilege level (e.g. privilege level 0 may have greater rights than privilege level 1).

For example, real time systems may allow virtualization in which multiple operating systems coexist on the same device, and a hypervisor manages the operating systems. In this type of environment, the first software may comprise one of the operating systems and the second software may comprise the hypervisor. The operating system and the hypervisor may each separately define access attributes for data accesses. If the hypervisor specifies that execution of the predetermined type of data access instruction can be interrupted but the operating system requires that the instruction cannot be interrupted, then the hypervisor can overrule the operating system so that the data access is marked as interruptable irrespective of the attribute set by the operating system. This prevents a guest operating system from producing inappropriate high latency scenarios.

While the present technique may be applied to any type of data access instruction for which long latency is a concern, it is particularly useful for a load multiple instruction for loading data from the data store to a plurality of registers or a store multiple instruction for storing data from the plurality of registers to the data store. Typically, a load or store multiple instruction may specify a list of registers, and execution of the load or store instruction requires a number of processing cycles which depends on the number of registers in the list. If a load or store multiple instruction is marked as non-interruptable, then the processor is committed to completing the multiple loads or stores and typically would not be able to service other operations until the multiple loads or stores are completed. This can lead to undesirably long latencies in handling other events which could be real-time-critical. To address this, even if the first software marks such instructions as non-interruptable, the second software at the higher privileged level can overrule to ensure that the load and store multiple instructions are interruptable (and repeatable at a later time) if necessary.

In some systems, the second software may always overrule the first software when the second software specifies that a data access can be interrupted and the first software specifies that it cannot be interrupted. However, there may be some situations in which it is desirable to allow the data access to continue as non-interruptable. Therefore, the processing apparatus may maintain a control value. If the at least one second attribute allows interruption of the data access, then the processing circuitry may determine based on the control value whether execution of the data access instruction can be interrupted. A first value of the control value can indicate that execution can be interrupted even if the first attribute specifies that it cannot be interrupted (so that the attribute specified by the second software overrules the attribute specified by the first software). A second value of the control value can indicate that whether the execution is interruptable should be determined based on the first attribute (so that the most restrictive of the first and second attributes is selected). The control value allows the system to select whether or not the access is forced to be non-interruptable by the second software. When latency-critical events are expected, then the control value can be set to the first value to ensure real time requirements are met, while when no such event is expected and so interrupt latency is not expected to be a problem, then the control value may be set to the second value to allow the data access to be controlled in the way defined by the first software. The control value may be set to the first or second value by the processing circuitry in response to the second software, such as the hypervisor for example.

Even if the second software overrules the non-interruptable first attribute set by the first software to set the data access as interruptable, the processing circuitry may still determine at least one other property of the data access instruction based on the at least one first attribute set by the first software. For example, the other property may be something which does not affect interrupt handling latencies and so is not real-time-critical. Hence, the access attribute determined for the data access instruction may correspond to a combination of properties defined by the first and second software.

For example, the other property may include an indication of whether execution of the predetermined type of data access instructions can be reordered relative to execution of other data access instructions. Also, the other property may include cache policy information for controlling how the data accessed in response to the data access instruction is cached. For example, the cache policy may specify whether a write access should be treated as a write through access, a write back access or a write allocate access, which affects when cache storage location is allocated to the accessed data and when the data is updated in that cache storage location. Similar policy information may be set for reads. Therefore, even when the control value has a first value to force the data access to be interruptable, the data access may retain some of the properties defined by the first software, such as the order of presentation on a bus and the cache policy information, while being interruptable and repeatable as required by the second software to prevent high latency situations.

In one example, the first and second attributes defined by the first and second software, and the final access attributes set for the data access instruction based on the combination of the first and second attributes, may each identify whether the data access instruction is a normal type of a data instruction or a device type of data instruction. Typically, normal type of data access instructions are interruptable and can be repeated or resumed at a later stage. Also, normal type of data accesses may be allowed to be reordered with respect to other accesses. On the other hand, device type of data access instructions cannot be interrupted and repeated and cannot be reordered relative to other data accesses. The device type of data access is often used by an operating system when the data access is expected to target a region of the data store which is mapped to an external device. Some external devices may be triggered to perform certain actions in response to a read or write to the corresponding device type memory region, and so it can be important that a sequence of reads or writes to the device type region should not be interrupted or reordered, as this could affect the operations performed by the external device. Therefore, the device type of data access is usually used to ensure correct behaviour of the device. However, in a virtualized system in which multiple operating systems are combined and a hypervisor manages the operating systems, there may not actually be an external device and the hypervisor may provide virtual functions corresponding to the device to appear to the operating system as if there is a real external device present. Therefore, it may not matter whether the device type data accesses can be interrupted or reordered, as there may not be a real device which would be affected by interruptions to these data accesses. The second software may be aware of whether a device type access set by the first software really needs to be a device type access, and if not then can overrule the first attribute to make the access a normal type of data access to ensure that it can be interrupted if required.

The data access instruction may specify an address of a location in a data store. The first and second attribute set by the first and second software may be determined based on the address. Different access attributes can be set for different memory regions of the data store which are identified based on a memory address or a portion of the memory address.

The attributes may be set using first and second memory attribute units which store first and second data defining the at least one first attribute and at least one second attribute. The data in the first and second memory attribute units may be set by the first and second software respectively. The memory attribute unit may be a memory protection unit which receives a physical address associated with the data access and looks up attribute data based on that address. Alternatively, the first and second memory attribute units may be a memory management unit which receives a virtual address, translates the virtual address to a physical address and determines corresponding access attributes for the data access based on either the original virtual address or the translated physical address. Therefore, there may be various ways of determining the first and second attributes.

The determination of the access attribute for the data access instruction may be made by various parts of the data processing apparatus. For example, the processing circuitry, the second memory attribute unit, or the data store could perform the determination of the access attribute based on the first and second attributes. Therefore, the present technique is not limited as to where this determination takes place within the data processing apparatus.

Viewed from another aspect, the present technique provides a data processing apparatus comprising:
processing means for processing data;
data storage means for storing data;
wherein said processing means is configured to execute first software at a first privilege level and to execute second software at a second privilege level higher than the first privilege level;
in response to a data access instruction for accessing data in the data storage means, the data processing apparatus is configured to determine at least one access attribute for said data access instruction based on at least one first attribute set by the first software and at least one second attribute set by the second software, said at least one first attribute and said at least one second attribute each specifying whether execution of the data access instruction can be interrupted; and
in response to a predetermined type of data access instruction for which said at least one second attribute specifies that execution of the data access instruction can be interrupted, the data processing apparatus is configured to determine said at least one access attribute specifying that execution of the data access instruction can be interrupted even if said at least one first attribute specifies that execution of the data access instruction cannot be interrupted.

Viewed from a further aspect, the present technique provides a data processing method for a data processing apparatus comprising processing circuitry configured to process data and a data store configured to store data, wherein said processing circuitry is configured to execute first software at a first privilege level and to execute second software at a second privilege level higher than the first privilege level; said method comprising:
in response to a data access instruction for accessing data in the data store, determining at least one access attribute for said data access instruction based on at least one first attribute set by the first software and at least one second attribute set by the second software, said at least one first attribute and said at least one second attribute each specifying whether execution of the data access instruction can be interrupted; and
in response to a predetermined type of data access instruction for which said at least one second attribute specifies that execution of the data access instruction can be interrupted, determining said at least one access attribute specifying that execution of the data access instruction can be interrupted even if said at least one first attribute specifies that execution of the data access instruction cannot be interrupted.

Embodiments of the technique will now be described, by way of example only, with reference to the accompanying drawings in which:

FIG. 1 schematically illustrates a data processing apparatus;

FIG. 2 schematically illustrates software operating at different privilege levels;

FIG. 3 schematically illustrates an example of memory attributes defined by respective software operating at different privilege levels;

Figure 1:
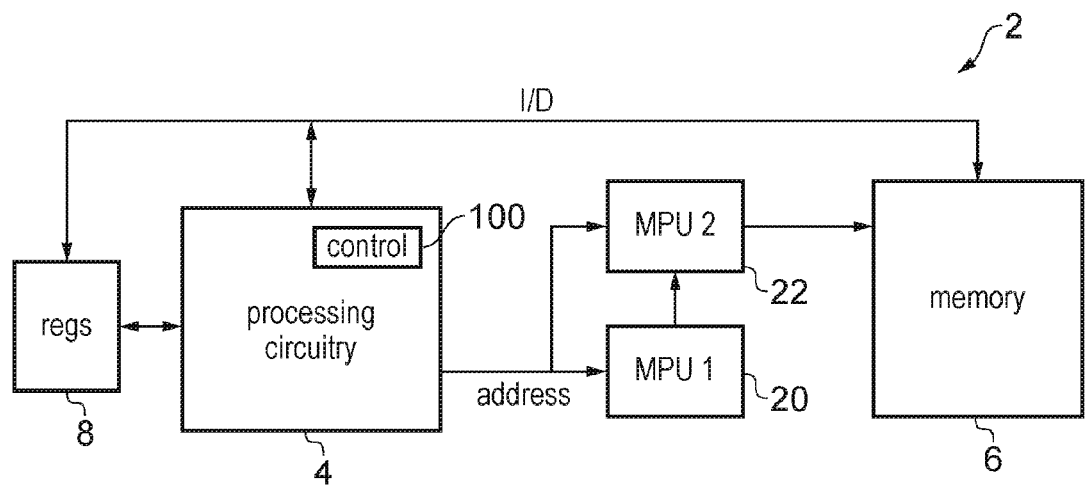

FIG. 1 schematically illustrates a portion of a data processing apparatus 2 comprising processing circuitry 4 for processing data and a memory (data store) 6 for storing data. The processing circuitry has registers 8 for storing values to be processed by the processing circuitry 4. Data can be loaded from memory 6 to the registers 8 and stored from the registers 8 to the memory 6. Instructions can be fetched from memory 6 to the processor 4. A data cache or instruction cache (not illustrated in FIG. 1) may be provided for storing data or instructions which can be accessed with lower latency than data or instructions in memory 6.

Figure 2:
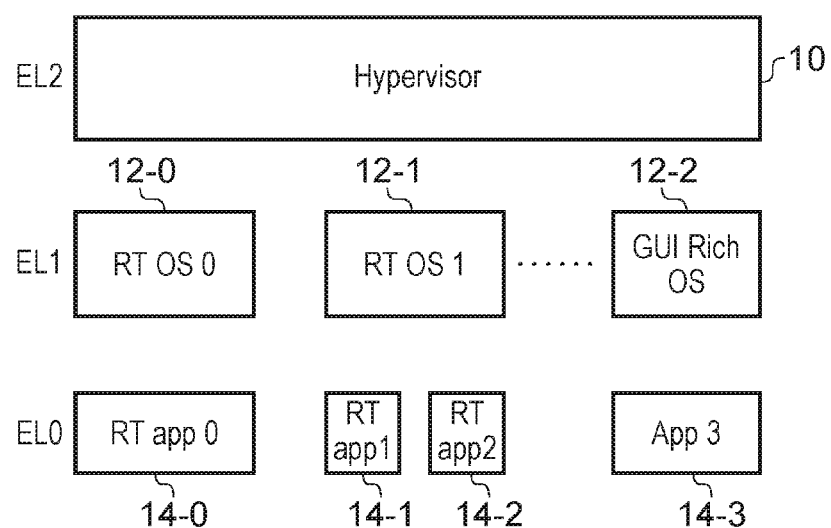

As shown in FIG. 2, the processing circuitry 4 supports software running at different privilege levels EL0, EL1 EL2. The hypervisor 10 is executed at the second privilege level EL2. The hypervisor 10 manages a number of guest operating systems 12 which are executed at the first privilege level EL1 which is a lower privilege level than EL2. The hypervisor 10 manages switching between different operating systems 12. For example, each operating system 12 may be allocated a different time slot during which the processing circuitry 4 executes that operating system 12. Each operating system 12 runs one or more applications 14 running at a base privilege level EL0, which is the lowest privilege level. The operating systems 12 include one or more real time operating systems (RTOS) 12-0, 12-1 and at least one non-real time ("GUI rich") operating system 12-2. The real time operating systems 12-0, 12-1 manage one or more real time applications 14-0, 14-1, 14-2, such as applications controlling the brakes and airbag systems within a vehicle for example, for which quick interrupt response handling is important for safety. The GUI rich operating system 12-2 is an operating system supporting a graphical user interface (GUI), such as Windows, iOS, Linux, etc. The GUI rich operating system 12-2 runs one or more non-real time applications 14-3, such as applications for controlling the stereo system within a vehicle, for which it is less important whether interrupts are handled quickly. Other systems may have more or fewer privilege levels (also known as "exception levels") than the 3 levels shown in FIG. 2.

Referring back to FIG. 1, the data processing apparatus 2 has a first memory protection unit (MPU) 20 storing data defining first memory access attributes set by one of the operating systems 12 executing at the first privilege level EL1. Each operating system 12 maintains its own set of memory access attributes which are loaded into the first MPU 20 when the processor 4 switches to executing that operating system 12. The processing circuitry 4 also has a second MPU 22 defining memory access attributes set by the hypervisor 10 at the second privilege level EL2. In response to a data access instruction, the processing circuitry 4 provides the address specified by the instruction to both the first MPU 20 and the second MPU 22 which look up respective access attributes for that address. The MPUs 20, 22 may determine based on the access attributes whether the access can be carried out, and may trigger a fault if the access is not allowed. For example, certain regions of the memory 6 may be designated as privileged which cannot be accessed by unprivileged instructions. The attributes may also define various properties which affect how the access is carried out by the memory 6, such as whether the access can be interrupted.

The attribute may also define cache policy information. For a read access, the cache policy information may specify whether the read is:
  read through: the required value is read from memory directly to the registers 8 of the processor 4 without placing a copy in a cache, or
  non-read through: the value is read from the memory 6 to the cache and then from the cache to the registers 8.
Similarly, for a write access, the access may be specified as:
  write through: on a cache hit, the value is written both to the cache and to memory;
  write back: on a cache hit, the value is written to the cache and the cache location storing the value is marked as dirty, but the value is not written back to memory 6 until the cache location needs to be reallocated for storing a different data value and the dirty data value is written back to memory 6;
  write allocate: on a cache miss, the required data value is loaded into the cache
  non-write allocate: on a cache miss, the required data value is modified in memory and is not loaded into the cache.
These are just some examples of properties that can be specified by the memory access attributes, and there may be many others.

In the example of FIG. 1, the address provided by the processor 4 is a physical address and the respective MPUs 20, 22 look up corresponding access attributes for that memory address. However, in other examples the MPUs 20, 22 may be replaced with memory management units (MMUs) which receive a virtual address from the processing circuitry 4 and translate the virtual address into a physical address as well as looking up memory access attributes. Different virtual-to-physical address mappings may be defined in the first MMU 20 by the operating systems 12 and in the second MMU 22 by the hypervisor 10. Hence, in general the MPUs or MMUs may be any memory attribute unit which contains data defining access attributes for data accesses which are looked up based on the memory address specified by the data access.

Figure 3:
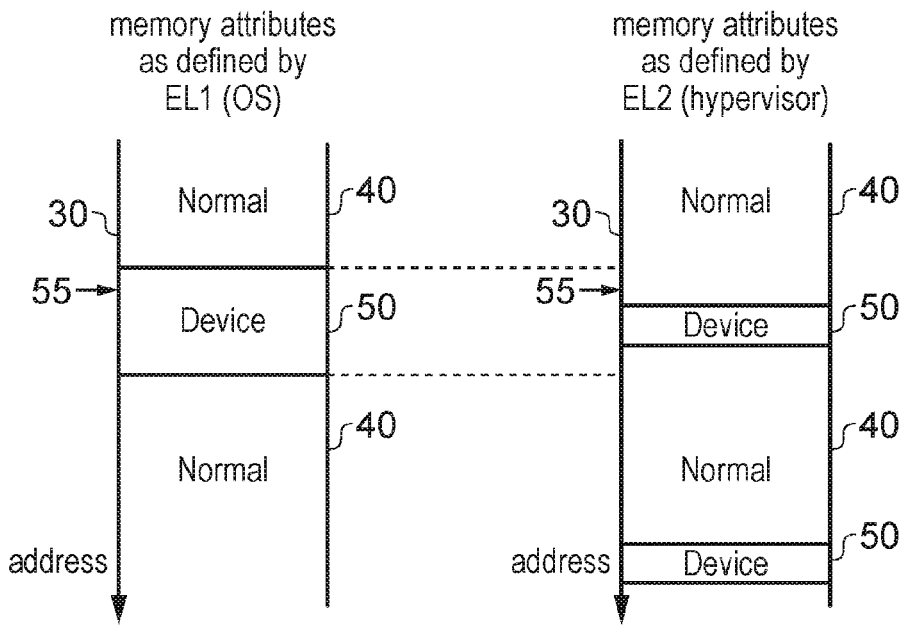

As shown in FIG. 3, the operating system 12 operating at the first exception level EL1 and the hypervisor 10 operating at the second exception level EL2 may define contradictory memory attributes for the same memory address. For example, as shown in the left hand part of FIG. 3 operating system 12 may designate different regions of the memory address space 30 as normal memory regions 40 or as device type regions 50. Memory access instructions targeting a normal region of memory 40 may be interrupted part way through the access and repeated or resumed later, while access instructions targeting a device type memory region 50 cannot be interrupted and repeated/resumed. Also, normal type accesses can be handled in a different order with respect to other accesses compared to their original program order, while device type accesses cannot be reordered. As shown in the right hand part of FIG. 3, the memory attributes defined by the hypervisor operating at the second privilege level EL2 may similarly define normal regions 40 and device type regions 50 of the address space 30. However, the regions defined by the hypervisor 10 may not be the same as the regions defined by the operating system 12. For example, a region of the address space 30 may be set as device type by the operating system 12 because it expects that this region is mapped to an external device, but in the virtualized system managed by the hypervisor 10 such a device may not be present and so the hypervisor 10 may mark such regions as normal instead. For example, for a data access targeting address 55 as shown in FIG. 3, the operating system 12 may specify the access as device type while the hypervisor 10 specifies the access as normal type.

Figure 4:
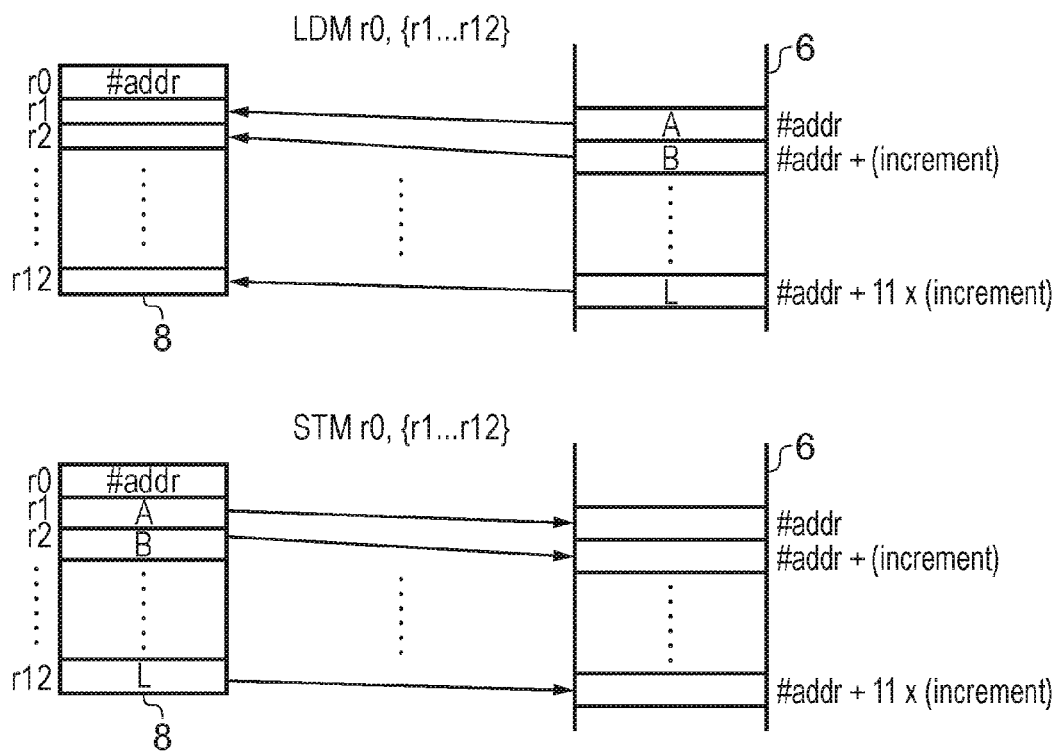
FIG. 4 illustrates an example of a load multiple instruction and a store multiple instruction.

FIG. 4 shows an example of some instructions for which this difference in memory attributes can be significant. FIG. 4 illustrates a load multiple instruction LDM for loading multiple values from memory 6 to registers 8. The load multiple instruction specifies an address register r0 including an address #addr indicating an address in memory 6 of a first value A to be loaded to the registers 8. The load multiple instruction also specifies a list of registers r1 to r12 identifying the registers into which the data values are to be loaded. As shown in FIG. 4, the value A stored at address #addr is loaded into register r1 and the address is then incremented for each subsequent value B-L to be loaded into the other registers r2 to r12. Similarly, the store multiple instruction STM specifies a register r0 containing an address #addr and a list of registers r1 to r12 from which data values A-L are to be stored to the memory, with the address #addr identifying the location in memory to which the first value A is to be stored and the address then being incremented to access the subsequent memory locations. The number of registers in the list determines the number of loads or stores which are carried out. Typically, the load/store multiple instructions may require one processing cycle per register. Although FIG. 4 illustrates an example where the address #addr is specified using a register, in other examples the address could be specified as an immediate value in the instruction encoding.

Figures 5, 6:
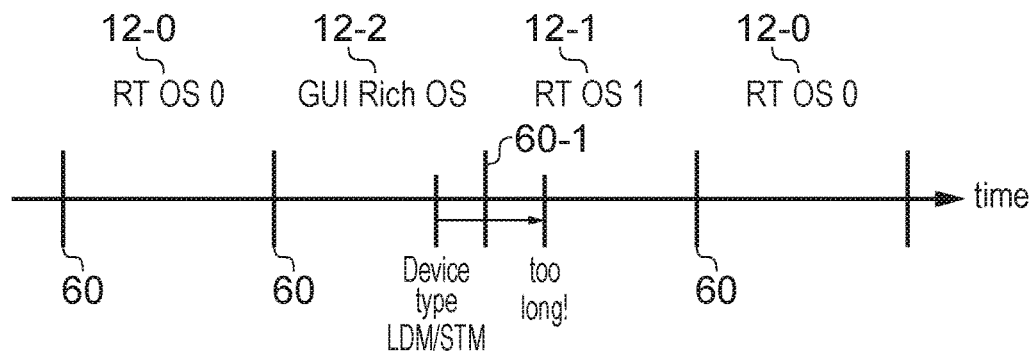
FIG. 5 illustrates an example in which a non-interruptable load/store multiple instruction causes a delay in handling an interrupt in a real time system.
FIG. 6 is a table showing how access attributes defined by software at first and second privilege levels may be combined to determine the access attribute to be used for a data access.

FIG. 5 illustrates a problem which may arise when a load or store multiple instruction is indicated as device type by the first MPU 20 under control of the operating system 12.

As shown in FIG. 5, time slots may be allocated to each operating system 12, with each operating system 12 being executed by the processing circuitry 4 during its respective time slot. Interrupts 60 are generated periodically to trigger the switch to a new operating system 12. While FIG. 5 shows the time slots having equal duration, this is not essential and it would be possible to allocate one operating system 12 a longer time slot than another operating system.

For the real time operating systems 12-0, 12-1, it is important that the interrupts 60 triggering the switch to that operating system 12 occur at deterministic times. As shown in FIG. 5, a non-real time operating system 12-2 may encounter a load multiple or store multiple instruction shortly before one of these interrupts 60-1 occurs. If the instruction is marked as device type then it cannot be interrupted. Performing multiple loads or multiple stores as shown in FIG. 4 can take several processing cycles, and so completing the load multiple or store multiple instruction could cause the operation to spill over into the time slot associated with the real time operating system 12-1, as shown in FIG. 5. If the instruction cannot be interrupted then this delays handing of the interrupt 60-1 for triggering the switch to the next operating system 12-1, which could be a problem as the real time operating system 12-1 may need to service a real time critical event at the start of its time slot.

In typical architectures, when multiple layers of memory attributes are defined for the same transaction, these attributes are typically combined to form a combined attribute which corresponds to the most restrictive of the original attributes. Hence, if one attribute specifies a transaction as device type and the other specifies it as normal type, then typically the transaction would be marked to the device type. However, in real time systems this would cause a problem of high interrupt latency as shown in FIG. 5, because the more restrictive device type attribute could lead to real time events being serviced too late.

To address this issue, the first access attribute defined by the first MPU 20 under control of the operating system 12 and the second attribute defined by the second MPU 22 under control of the hypervisor 10 can be combined in a different way as shown in FIG. 6. If the second MPU 22 determines that a transaction should be of the device type, then the overall attribute is set as device type irrespective of the state of the corresponding first attribute set by the first MPU 20 (see the bottom row of FIG. 6). Also, if the first and second MPUs 20, 22 both set a transaction as normal type, then the overall attribute is also set as normal type (top left box of FIG. 6).

However, when the hypervisor designates a transaction as normal type, and the operating system sets the transaction as device type (top right box in FIG. 6), then a control value 100 maintained by the processing circuitry is used to determine the overall memory access attribute for that transaction. The control value 100 may be maintained in a number of ways and may be stored at any location within the data processing apparatus 2, such as within the registers 8 or the memory 6. Alternatively, the control value 100 may be stored at a location within the processing circuitry 4 as shown in FIG. 1. In one example, the processing circuitry 4 may have a control register which includes a number of control bits controlling different properties of the processor 4, and the memory attribute control value 100 may be one of these control bits. Also, the second MPU 22 could maintain the control value 100.

The control value 100 controls the setting of the normal/ device type attribute for at least one particular type of data access instruction which the hypervisor specifies as normal type. If the control value has a first value (e.g. a value of 1) then the transaction is marked as normal so that the hypervisor 10 setting of normal type overrules the device type set by the operating system 12. Nevertheless, other properties of the transaction may be retained according to the device state specified by the operating system 12. For example, the property where the transaction is processed in its original order with respect to other transactions may be retained according to device transactions, but the transaction may be interruptable according to normal transactions. Note that when the control value is 1 then the overall attribute will be set to the attribute specified by the hypervisor irrespective of which attribute is specified by the operating system 12.

On the other hand, if the control value 100 has a second value (e.g. 0) then the transaction can be marked as device type according to the first attribute set by the first MPU 20 even if the hypervisor has specified the access as normal type using the second MPU 22. This means that the data access will still be treated as non-interruptable. When the control value 100 is 0 then the overall access attribute for the data access will be set according to the most restrictive of the attributes set by the first and second MPU 20, 22, so that if either the hypervisor 10 or the operating system 12 defines a device type access then the overall attribute will also be device type.

Figure 7:
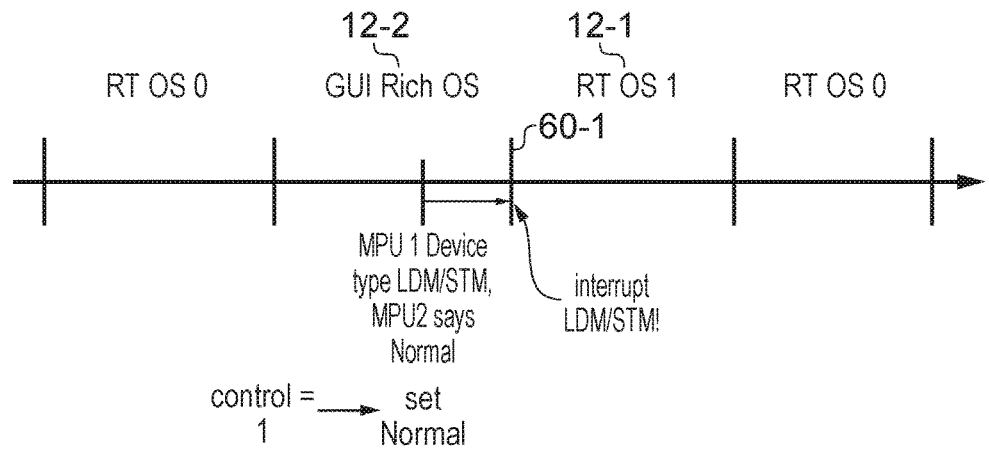
FIG. 7 shows an example of how determining the access attribute in this way prevents the high interrupt latency shown in FIG. 5.

The control value 100 can be set by software, such as by the hypervisor 10 for example. This allows the hypervisor 10 to control whether the device type indications by the operating system 12 can be overruled. When a real time critical event is expected to occur, such as the interrupt 60 triggering the onset of a real time operating system, then the control value can be set to 1 so that even if the first MPU 20 defines the transaction as device type, the transaction may still be considered as normal and will be interruptable. Therefore as shown in FIG. 7, even if a load or store multiple instruction is started by the non-real time operating system 12-2, when the interrupt 60-1 occurs then the load store multiple instruction is interrupted to allow the operating system 12-1 to process real time events. The load or store multiple instruction can then be restarted or resumed when the non-real time operating system 12-2 receives its next slot on the processor 4. On the other hand, if no real time critical events are expected then the hypervisor can set the control value to 0 to indicate that if the operating system 12 designates a transaction as device type, then it should be treated as a device type so that it cannot be interrupted.

The determination of the access attribute shown in FIG. 6 may be made by the second MPU 22, which may receive the first attribute from the first MPU 20 and combine it with its own looked up second attribute to form the overall attribute. Alternatively, both first and second attributes may be provided to the memory 6, which may have control logic for determining the combined attribute which determines how the access is handled by the memory 6.

While FIG. 6 shows an example in which a control value of 1 indicates that the hypervisor's "normal" attribute should overrule the operating system's "device" attribute, and a value of 0 indicates that the operating system's "device" attribute should be used, in other examples the opposite mapping may be used, such that the meanings of 0 and 1 are swapped. The technique shown in FIG. 6 may be used only for predetermined types of data access instructions such as a loads multiple instruction or store multiple instruction, or other data access instructions expected to cause long latency if they are non-interruptable. In other examples, it could be used for all data access instructions. For instructions for which the technique shown in FIG. 6 is not used, the more restrictive of the respective attributes specified by the first and second MPUs 20, 22 may be taken (similar to the case when the control value 100 has a value of 0 as shown in FIG. 6).

Also, it is possible to implement the present technique without a control value 100 being provided. In this case, for the predetermined type of instruction, the MPU 22 could always overrule the first MPU 20 so that if the hypervisor 10 designates a transaction as "normal" type then it can be interrupted even if the operating system 12 designates it as "device" type.

Also, the technique shown in FIG. 6 may be used only for the predetermined type of data access instruction when it is executed at the base privilege level EL0 or the first privilege level EL1. Data access instructions executed by the hypervisor level EL2 may not be subject to this technique and may instead be treated as device type or normal type instructions based on the permissions set by the second MPU 22, irrespective of any attributes set by the first MPU 20 for the same address (similar to the case when the control value 1 as shown in FIG. 6).

In some systems, this technique may be applied more generally to provide a control bit 100 which is set by software executing at a higher privilege level to control whether predetermined types of data access instructions executing at a lower privilege level can be interrupted or not. That is, the higher and lower privilege level software need not be software executing at privilege levels EL2, EL1 respectively and may instead operate at any two privilege levels within a hierarchy of privilege levels.

Figure 8:
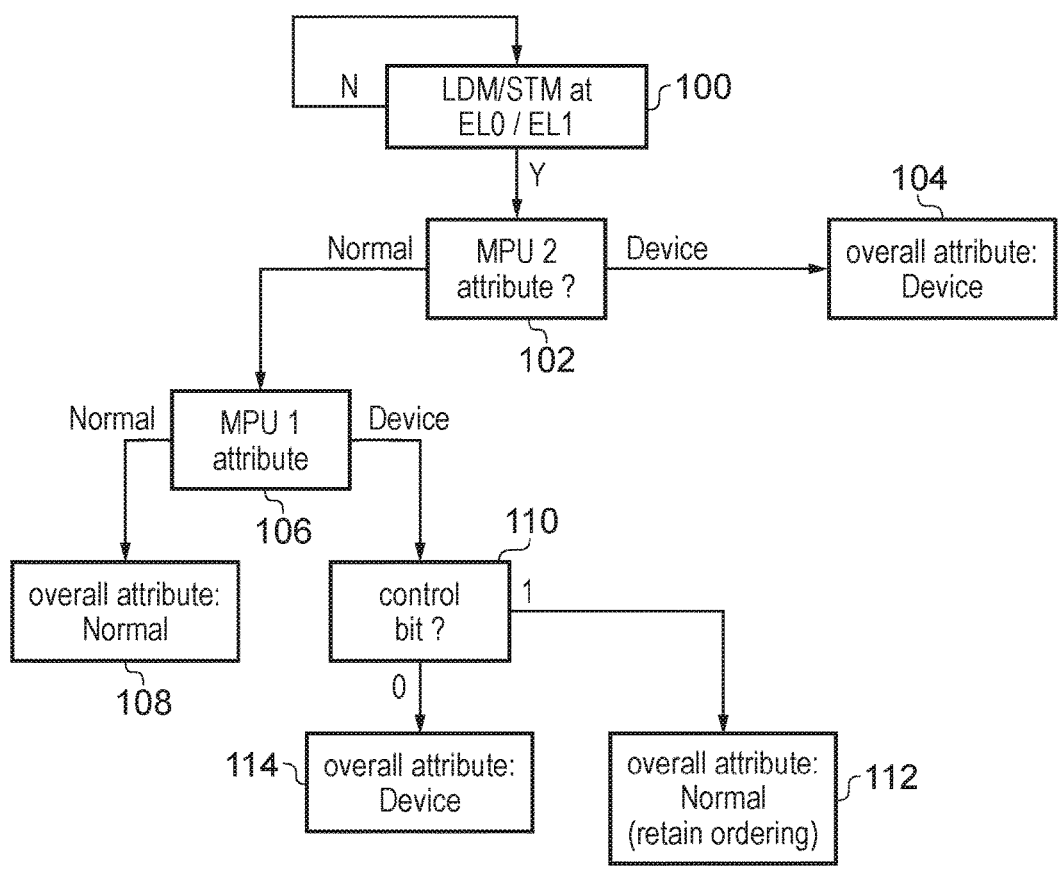
FIG. 8 illustrates a method of determining an access attribute for a predetermined type of data access instruction.

FIG. 8 schematically illustrates an example of a method of determining memory access attributes for a data access instruction. At step 100, it is determined whether the processor 4 is to execute a predetermined data access (in this example, a load multiple instruction or store multiple instruction from software executing at the base privilege level EL0 or the first privilege level EL1 ). If not, then the memory access attributes for the data access instruction are determined in other ways such that those known in the prior art. On the other hand, if a load or store multiple instruction is encountered at privilege levels EL0 or EL1 then the method proceeds to step 102 where the second MPU 22 determines the second attribute for that instruction. If the second attribute is device type, then at step 104 the overall access attribute for the instruction is determined as device type and the instruction is issued to memory 6. The data access therefore cannot be interrupted or reordered and so the processor 4 is committed to completing the load or store multiple instruction before carrying out other accesses.

On the other hand, if at step 102 the second MPU determines that the data access is a normal type of access, then at step 106 the first MPU 20 determines the attribute for the data access instruction. In practice, steps 102 and 106 may be performed in parallel by the respective MPUs 20, 22, or step 106 may be performed before step 102. If the first attribute determined by the first MPU 20 at step 106 is normal (i.e. both MPUs 20, 22 have defined the access as normal) then at step 108 the overall access attribute 100 is determined as normal for this instruction. Therefore, the multiple load or store instruction can be interrupted if necessary.

On the other hand, if at step 106 is determined that the attribute is device type (i.e. the hypervisor 10 has defined the transaction as normal and the operating system has defined it as device) then at step 110 the system checks the control bit 100. If the control bit has a first value (one in this example) then at step 112 the overall attribute is set as normal to indicate that the instruction is non-interruptable. Therefore the hypervisor has overruled the device type indication set by the operating system 12. However, at least one other property of the transaction associated with the device type indication set by the operating system 12 may be retained. For example the fact that the transaction should not be reordered compared to other transactions, so that the transactions are presented on the memory bus in their original order, may be retained. Also, cache read/write policy information defined by the first MPU 20 according to the operating system 12 may also be retained. On the other hand, if the control bit 110 has a second value (e.g. 0), then at step 114 the attribute for the instruction is set as device type so that when it is issued to the memory 6 it cannot be interrupted. In this case, the more restrictive device indication provided by the first MPU 20 is taken.

Although illustrative embodiments have been described in detail herein with reference to the accompanying drawings, it is be understood that invention is not limited to those precise embodiments, and that various changes and multiplications can be made by a person skilled in the art without the parting from the scope of the invention as defined by the appended claims.

The invention claimed is:

1. A data processing apparatus comprising:
   processing circuitry configured to process data;
   a data store configured to store data;
   wherein said processing circuitry is configured to execute first software at a first privilege level and to execute second software at a second privilege level higher than the first privilege level;
   in response to a data access instruction for accessing data in the data store, the data processing apparatus is configured to determine at least one access attribute for said data access instruction based on at least one first attribute set by the first software and at least one second attribute set by the second software,
   said at least one first attribute and said at least one second attribute each specifying one of:
   (i) that execution of the data access instruction can be interrupted part way through a data access triggered by the data access instruction, and
   (ii) that servicing of an interrupt should be delayed until the data access is complete; and
   in response to a predetermined type of data access instruction for which said at least one second attribute specifies that execution of the data access instruction can be interrupted part way through the data access, the data processing apparatus is configured to determine said at least one access attribute specifying that execution of the data access instruction can be interrupted part way through the data access even if said at least one first attribute specifies that servicing of the interrupt should be delayed until the data access is complete,
   wherein the processing circuitry is configured to support a plurality of operating systems, the first software comprises one of the plurality of operating systems and the second software comprises a hypervisor for managing the plurality of operating systems, and
   wherein the at least one access attribute, the at least one first attribute, and the at least one second attribute each identify whether the data access instruction is a normal type of data access instruction which can be interrupted part way through the data access or a device type of data access instruction for which servicing of the interrupt should be delayed until the data access is complete.

2. The data processing apparatus according to claim 1, wherein said predetermined type of data access instruction comprises a data access instruction to be executed over a plurality of processing cycles.

3. The data processing apparatus according to claim 1, wherein said predetermined type of data access instruction comprises an instruction of said first software or an instruction of further software running under control of the first software.

4. The data processing apparatus according to claim 1, wherein the predetermined type of data access instruction comprises a load multiple instruction for loading data from the data store to a plurality of registers of the data processing apparatus, or a store multiple instruction for storing to the data store data from a plurality of registers of the data processing apparatus.

5. The data processing apparatus according to claim 1, wherein the data processing apparatus is configured to maintain a control value; and
    in response to said predetermined type of data access instruction for which said at least one second attribute specifies that execution of the data access instruction can be interrupted part way through the data access, the data processing apparatus is configured to determine based on the control value whether the at least one access attribute specifies that execution of the data access instruction can be interrupted part way through the data access.

6. The data processing apparatus according to claim 5, wherein for said predetermined type of data access instruction:
    when the control value has a first value, the data processing apparatus is configured to determine the at least one access attribute specifying that execution of the data access instruction can be interrupted part way through the data access even if said at least one first attribute specifies that servicing of an interrupt should be delayed until the data access is complete; and
    when the control value has a second value, the data processing apparatus is configured to determine based on the at least one first attribute whether the at least one access attribute specifies that execution of the data access instruction can be interrupted part way through the data access.

7. The data processing apparatus according to claim 5, wherein the processing circuitry is configured to set the control value in response to the second software.

8. The data processing apparatus according to claim 1, wherein when the data processing apparatus determines said at least one access attribute specifying that execution of said data access instruction can be interrupted part way through the data access when said at least one first attribute specifies that servicing of the interrupt should be delayed until the data access is complete, then the data processing apparatus is configured to determine said at least one access attribute specifying at least one other property of the data access instruction determined based on said at least one first attribute.

9. The data processing apparatus according to claim 8, wherein said at least one other property comprises at least one of:
    (i) whether execution of said predetermined type of data access instruction can be reordered relative to execution of other data access instructions;
    (ii) cache policy information for controlling how the data accessed in response to the data access instruction is cached.

10. The data processing apparatus according to claim 1, wherein the data access instruction specifies an address of a location in the data store, and the data processing apparatus is configured to determine the at least one first attribute and the at least one second attribute based on at least a portion of the address.

11. The data processing apparatus according to claim 1, comprising a first memory attribute unit configured to store first data defining the at least one first attribute, wherein the processing circuitry is configured to set the first data in response to the first software.

12. The data processing apparatus according to claim 1, comprising a second memory attribute unit configured to store second data defining the at least one second attribute, wherein the processing circuitry is configured to set the second data in response to the second software.

13. A data processing apparatus comprising:
    processing means for processing data;
    data storage means for storing data;
        wherein said processing means is configured to execute first software at a first privilege level and to execute second software at a second privilege level higher than the first privilege level;
        in response to a data access instruction for triggering a data access in the data storage means, the data processing apparatus is configured to determine at least one access attribute for said data access instruction based on at least one first attribute set by the first software and at least one second attribute set by the second software,
        said at least one first attribute and said at least one second attribute each specifying one of:
            (i) that execution of the data access instruction can be interrupted part way through a data access triggered by the data access instruction, and
            (ii) that servicing of an interrupt should be delayed until the data access is complete; and
        in response to a predetermined type of data access instruction for which said at least one second attribute specifies that execution of the data access instruction can be interrupted part way through the data access, the data processing apparatus is configured to determine said at least one access attribute specifying that execution of the data access instruction can be interrupted part way through the data access even if said at least one first attribute specifies that servicing of the interrupt should be delayed until the data access is complete,
        wherein the processing means is configured to support a plurality of operating systems, the first software comprises one of the plurality of operating systems and the second software comprises a hypervisor for managing the plurality of operating systems, and
        wherein the at least one access attribute, the at least one first attribute, and the at least one second attribute each identify whether the data access instruction is a normal type of data access instruction which can be interrupted part way through the data access or a device type of data access instruction for which servicing of the interrupt should be delayed until the data access is complete.

14. A data processing method for a data processing apparatus comprising processing circuitry configured to process data and a data store configured to store data, wherein said processing circuitry is configured to execute first software at a first privilege level and to execute second software at a second privilege level higher than the first privilege level; said method comprising:
- determining, in response to a data access instruction for accessing data in the data store, at least one access attribute for said data access instruction based on at least one first attribute set by the first software and at least one second attribute set by the second software, said at least one first attribute and said at least one second attribute each specifying one of:
  - (i) that execution of the data access instruction can be interrupted part way through a data access triggered by the data access instruction, and
  - (ii) that servicing of an interrupt should be delayed until the data access is complete; and
- determining, in response to a predetermined type of data access instruction for which said at least one second attribute specifies that execution of the data access instruction can be interrupted part way through the data access, said at least one access attribute specifying that execution of the data access instruction can be interrupted part way through the data access even if said at least one first attribute specifies that servicing of the interrupt should be delayed until the data access is complete, wherein the processing circuitry is configured to support a plurality of operating systems, the first software comprises one of the plurality of operating systems and the second software comprises a hypervisor for managing the plurality of operating systems, and wherein the at least one access attribute, the at least one first attribute, and the at least one second attribute each identify whether the data access instruction is a normal type of data access instruction which can be interrupted part way through the data access or a device type of data access instruction for which servicing of the interrupt should be delayed until the data access is complete.

* * * * *